May 25, 1965     H. L. MORRILL, JR     3,185,523

AUXILIARY STRUCTURE FOR AN AUTOMOBILE SEAT

Filed April 30, 1964

INVENTOR.
HARRY L. MORRILL, JR.

BY *Kimmel & Crowell*
ATTORNEYS.

United States Patent Office 3,185,523
Patented May 25, 1965

3,185,523
AUXILIARY STRUCTURE FOR AN AUTOMOBILE SEAT
Harry L. Morrill, Jr., P.O. Box 6467, Trails End Road, Marietta, Ga.
Filed Apr. 30, 1964, Ser. No. 363,762
5 Claims. (Cl. 297—226)

This invention relates to an auxiliary structure for an automobile seat and more particularly to an auxiliary seat pad to be carried by the conventional seat portion of the car seat, the auxiliary seat pad including a bottom pad member which is fixed relative to the car seat and a top pad member which is movable relative to the bottom pad member to facilitate getting into and out of the car seat.

The invention disclosed herein constitutes an improvement over the invention disclosed in my prior Patent No. 2,987,115 which was issued June 6, 1961, for a "Swivel Seat for Automobiles," and which was an improvement over the invention disclosed in my prior Patent No. 2,811,199 which was issued October 29, 1957, for an "Automobile Seat."

A primary object of this invention is the provision of a swivel or revoluble auxiliary car seat structure which is sturdy and durable in construction, reliable and efficient in operation, and relatively simple and inexpensive to manufacture, assemble, utilize and maintain.

Another object of this invention is the provision of a device of the type described, which is quickly and easily attached to, and removed from, the car seat.

A further object of the instant invention is the provision of an auxiliary structure for an automobile seat which may be readily modified for use adjacent either a left hand or a right hand car door.

Other and further objects reside in the combination of elements, arrangement of parts, and features of construction.

Still other objects will in part be obvious and in part be pointed out as the description of the invention proceeds and as shown in the accompanying drawing wherein.

Similar reference characters refer to similar parts throughout the several views of the drawing.

Figure 1:
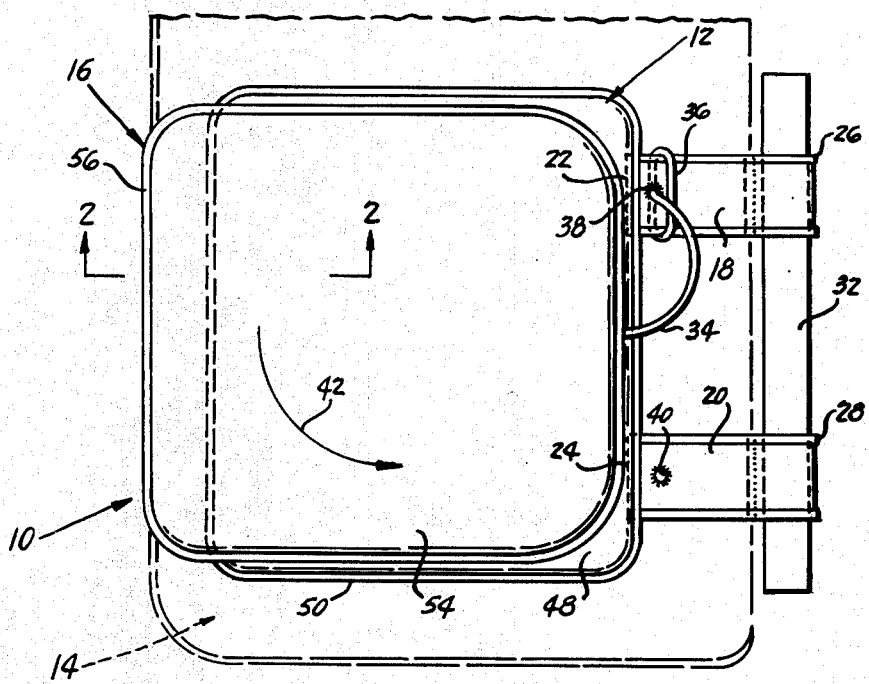
FIGURE 1 is a top plan view of a swivel seat attachment in accordance with the instant inventive concept, the seat portion of a conventional car seat being shown in dotted lines.
Figure 2:
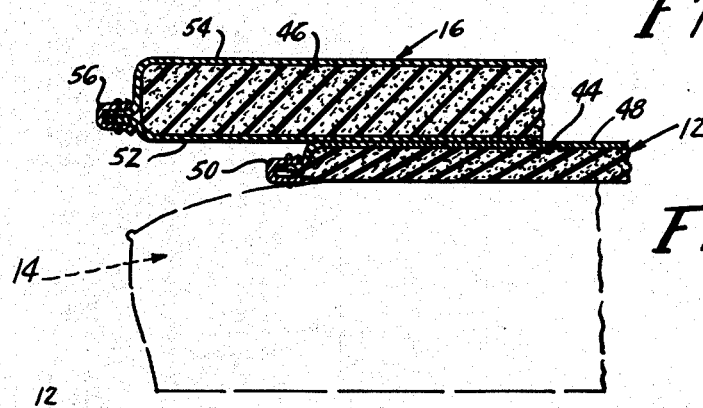
FIGURE 2 is a fragmentary enlarged transverse cross-sectional view taken substantially on line 2—2 of FIGURE 1.
Figure 3:
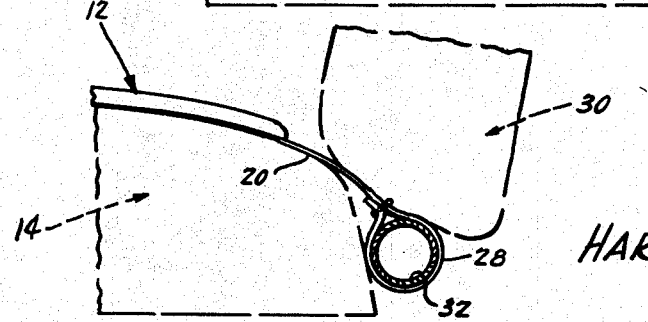
FIGURE 3 is a fragmentary side elevational view through the rear portion of a bottom pad member showing the securing means holding the same in position, parts of the seat portion and the back rest portion of the car seat being shown in dotted lines.

Referring now to the drawing, a device in accordance with the instant inventive concept is designated generally by the reference numeral 10 and comprises basically a bottom pad member 12 resting on the seat portion 14 of a conventional car seat or the like and a top pad member 16 resting on the bottom pad member 12.

The bottom pad member 12 is preferably square or polygonal as shown with a pair of spaced anchor tabs 18, 20 extending in spaced relation from one edge thereof and secured thereto in any conventional manner as by stitching 22, 24. The opposite ends of the anchor tabs 18, 20 define looped elements 26, 28 which pass between the seat portion 14 and the back rest portion 30 of the car seat to receive therethrough an enlarged element 32, which might be in the form of a dowel paper tube, a roll of paper or a tubular or cylindrical metal or wood member, to preclude disengagement of the anchor tabs 18, 20 from the car seat. Separate enlarged elements may be used for each tab.

The top pad member 16 is preferably rectangular or polygonal as shown with a flexible connecting strap 34 having one end thereof secured substantially centrally to one edge of the same and the other end thereof inserted down through one of the apertures 38, 40 in a selected anchor tab 18, 20 and thence to one side of the tab and up and over the top of the tab and then back under the tab and detachably tied to the strap at the point of emergence thereof from the aperture to define a loop 36 by which the strap is removably connected to the selected tab. It will be understood that if the top pad member 16 is to be swiveled in a counterclockwise direction as seen in FIGURE 1 and as indicated by the arcuate arrow 42 for use with a left hand car door (not shown), the connecting strap 34 would be attached to the right hand anchor tab 18. In the event that the device 10 were to be utilized on the opposite or passenger's side of the car seat, the connecting strap 34 would be removed from the anchor tab 18 and attached to the anchor tab 20 to facilitate swiveling of the top pad member in a clockwise direction as would be necessary for use with a right hand car door.

Each of the pad members 12, 16 includes a foam rubber or plastic cushion element 44, 46, the bottom pad member 12 having the upper surface of the cushion element 44 covered by a relatively slick material 48, the edge of the same being held in place by a conventional bead 50. The lower surface of the cushion element 44 is left uncovered to define a relatively rough portion thereby increasing frictional contact with the seat portion 14 of the car seat. The cushion element 46 of the top pad member 16 has its lower surface covered by a relatively slick material 52, the slick adjacent surfaces 48, 52 of the bottom and top pad members 12, 16, respectively, reducing friction therebetween to facilitate relative motion. The upper surface of the cushion element 46 may be covered with any desired material 54, the materials 52 and 54 being secured together by a conventional bead 56.

The use and operation of the device of the instant invention will now be apparent. The bottom pad member 12 is positioned on the seat portion 14 of the car seat on whichever side of the car it is to be used. The connecting strap 34 is then connected to the selected tab in accordance with the positioning of the bottom pad 12 on the car seat as explained hereinbefore. The ends of the anchor tabs 18, 20 are then passed between the seat portion 14 and the back rest portion 30 of the car seat, the loops 26, 28 of the anchor tabs being secured in position by receiving the enlarged element 32. The user will then swivel the top pad member 16 toward the car door before entering the same. The top pad member 16 will then readily swivel on the bottom pad member 12 as the user slides into the car. This procedure is reversed in exiting from the car door. The device 10 may readily be modified for use with the car seat on the opposite side of the car by simply removing the enlarged element 32, disengaging the connecting strap 34 from one anchor tab, and re-engaging it with the other anchor tab, passing the anchor tabs 18, 20 between the seat portion 14 and back rest portion 30 of the car seat at the new location, and reinserting the enlarged element 32 in the loop elements 26, 28.

It will now be seen that there is herein provided an improved auxiliary structure for an automobile seat which satisfies all of the objectives of the instant invention, and others, including many advantages of great practical utility and commercial importance.

Since many embodiments may be made of this inventive concept, and since many modifications may be made of the embodiments hereinbefore shown and described, it

I claim:

1. An auxiliary structure for an automobile seat having a seat portion and a back rest portion, said auxiliary structure comprising a bottom pad member resting on the seat portion of the car seat and a top pad member resting on said bottom pad member, anchor tabs extending in spaced relation from one edge of said bottom pad member, an aperture in each of said anchor tabs, securing means removably fixing said anchor tabs to the car seat, and connecting means by which said top pad member is connected to said bottom pad member for limited relative movement thereof with respect to said bottom pad member; said connecting means comprising a flexible strap having one end thereof secured substantially centrally to one edge of said top pad member and the other end thereof inserted down through the said aperture in a selected one of said anchor tabs and thence to one side of said selected one of said anchor tabs and up over the top thereof and then back under said selected tab and detachably tied to said strap at the point of emergence thereof from the said aperture in the said selected one of said tabs thereby defining a loop at the free end of said strap through which said selected anchor tab extends.

2. The structure of claim 1 wherein said bottom and top pad members have relatively slick adjacent surfaces to reduce friction therebetween.

3. The structure of claim 1 wherein said bottom pad member has a relatively rough lower surface to increase frictional contact with the seat portion of the car seat.

4. The structure of claim 1 wherein said anchor tabs pass between the seat portion and the back rest portion of the car seat, said securing means including an enlarged element removably carried by the ends of each anchor tab after passing between the seat portion and the back rest portion of the car seat.

5. The structure of claim 4 wherein said anchor tabs each include a loop element defined at its end, said enlarged element passing through said loop elements of said anchor tabs.

References Cited by the Examiner

UNITED STATES PATENTS

| 1,444,521 | 2/23 | Pearl | 297—219 |
| 1,974,723 | 9/34 | Richig | 297—219 |
| 2,096,423 | 10/37 | Burr | 5—337 |
| 2,109,652 | 3/38 | Sallop et al. | 297—253 |
| 2,205,302 | 6/40 | Morgenstern | 297—219 |
| 2,811,199 | 10/57 | Morrill | 297—226 |
| 2,944,591 | 7/60 | Morrill | 297—253 |
| 2,987,115 | 6/61 | Morrill | 248—425 |

FRANK B. SHERRY, *Primary Examiner.*